United States Patent [19]

Krejsa

[11] 4,073,000
[45] Feb. 7, 1978

[54] ELECTRICAL INTERLOCK APPARATUS FOR ELECTRICAL EQUIPMENT

[75] Inventor: Richard E. Krejsa, Des Plaines, Ill.

[73] Assignee: S & C Electric Company, Chicago, Ill.

[21] Appl. No.: 701,065

[22] Filed: June 30, 1976

[51] Int. Cl.² .............................................. H02B 1/04
[52] U.S. Cl. ................................ 361/344; 200/50 A; 200/61.7
[58] Field of Search ...................... 361/344, 343, 335; 200/50 R, 50 A, 50 AA, 61.62, 61.66, 61.64, 61.7

[56] References Cited

U.S. PATENT DOCUMENTS

| | | | |
|---|---|---|---|
| 3,278,698 | 10/1966 | Metz | 200/50 A |
| 3,715,554 | 2/1973 | Vmezu | 200/50 A |
| 3,967,088 | 6/1976 | Horivchi | 200/50 A |
| 4,006,121 | 2/1977 | Isono | 200/50 A |

*Primary Examiner*—Gerald P. Tolin
*Attorney, Agent, or Firm*—Kirkland & Ellis

[57] ABSTRACT

An interlock switch arrangement is used to disconnect the low voltage connections of electrical components such as transformers and the like in metal-enclosed switchgear. An electrical switch is mounted within a switch housing positioned and mounted adjacent to the access opening of the metal enclosure of the switchgear. A key projection or finger is mounted on a door overlying the access opening to the enclosure and positioned to enter an opening in the switch housing when the door is closed and to actuate the switch so that an electrical circuit is completed for electrical components within the enclosure. When the door is opened, the key projection disengages the switch causing the switch to open thereby electrically disconnecting the components so that a serviceman can perform maintenance with improved security against electrical shock. Typically, the invention is used on metal-enclosed switchgear having a double-door arrangement, i.e., an inner screen door and a outer solid door, and the projection is mounted on the inner screen door so that once the screen door is opened, certain of the electrical components are disconnected. However, when only visual inspection is desired, the outer door only may be opened so that the components can be observed through the inner screen door without the necessity of disconnecting the electrical components.

3 Claims, 5 Drawing Figures

U.S. Patent    Feb. 7, 1978    Sheet 1 of 2    4,073,000
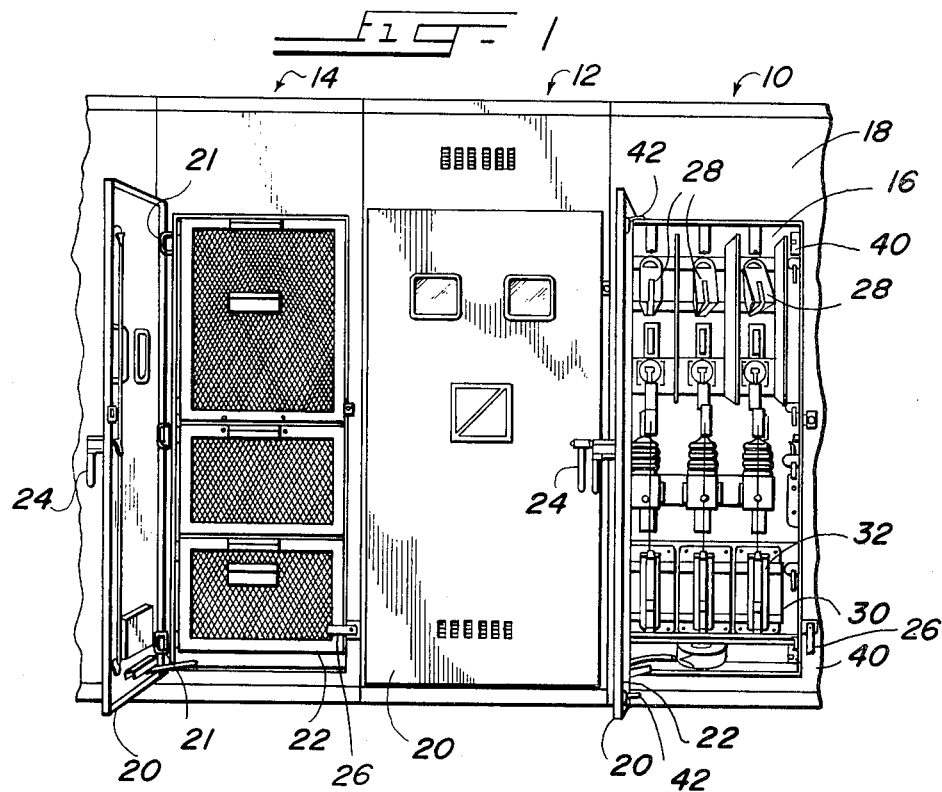
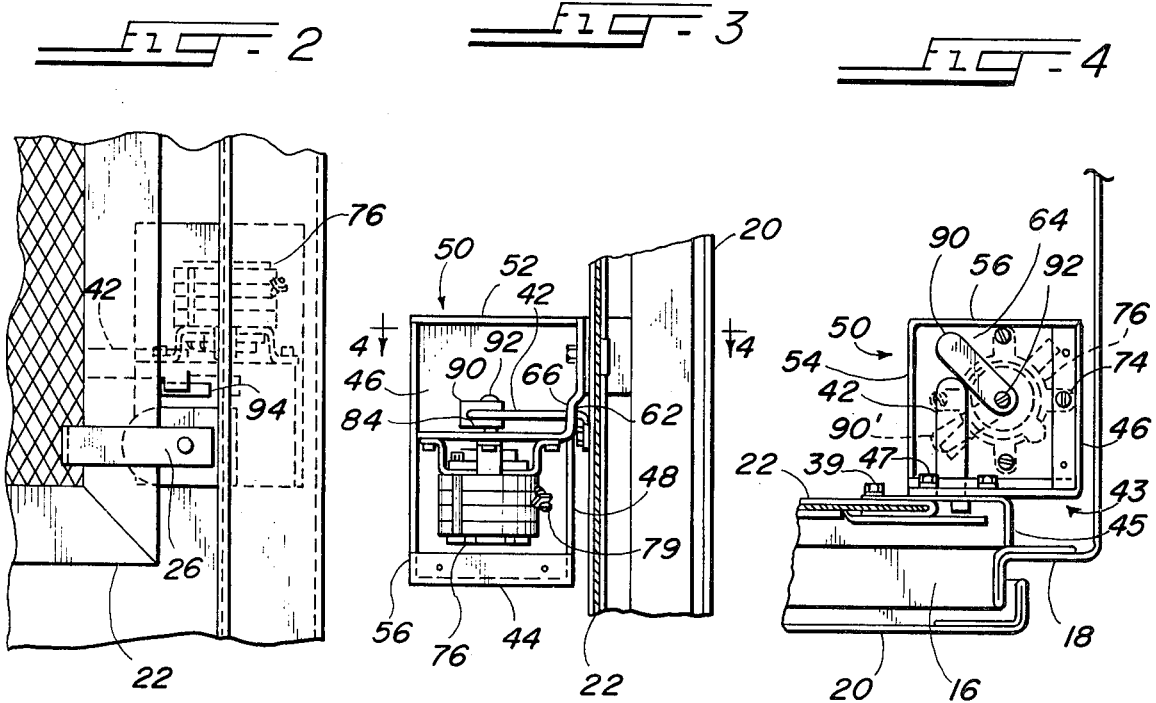

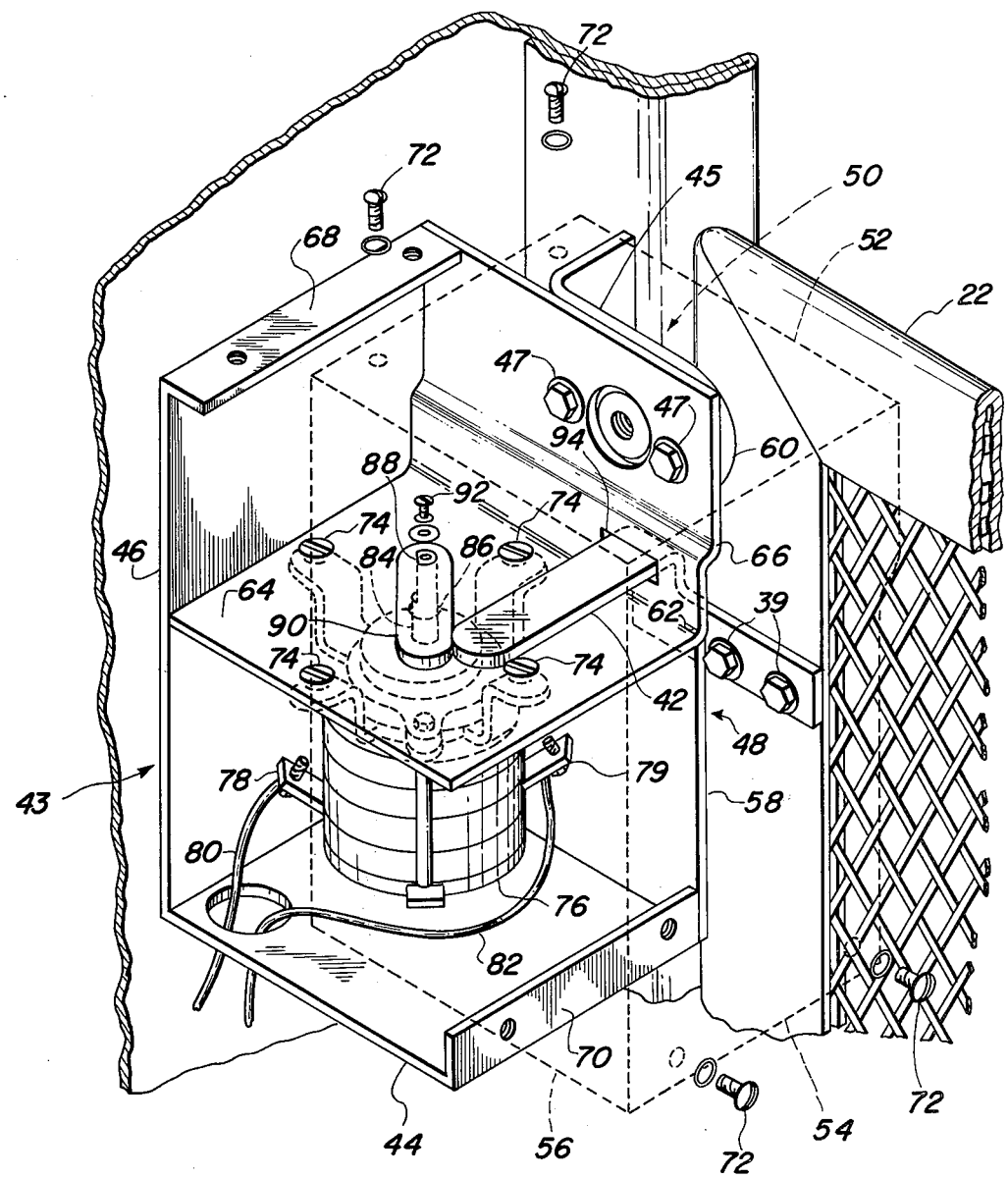

ELECTRICAL INTERLOCK APPARATUS FOR ELECTRICAL EQUIPMENT

BACKGROUND OF THE INVENTION

1. Field of the Invention

The present inventio relates to electrical interlock apparatus for electrical equipment, and more specifically, to electrical switch interlock apparatus for metal-enclosed switchgear which disconnects electrical components within the switchgear automatically by opening a door over the access opening to the switchgear before human access is possible.

2. Description of the Prior Art

Metal-enclosed switchgear is well known in the art. Typically, such switchgear is utilized in electrical distribution systems for large buildings, factories, subdivisions, portions of subdivisions, etc. Such switchgear typically may include transformers, fuses, interrupter switches, electrical switches, and other such electrical components necessary for the electrical distribution system.

The switchgear typically comprises a metal enclosure having one or more doors or overlying access openings into the interior portions of the enclosure where the components are situated. Since the electrical components typically are electrically charged, such metal-enclosed switchgear ordinarily have lock arrangements to preclude unauthorized access and vandalism.

In addition, the switchgear also may utilize a double-door arrangement whereby a solid outer door overlies an inner screen door overlying the access opening into the switchgear. Thus, the outer door may be opened without opening the inner screen door to permit visual observation of the component while precluding accidental contact with the energized component within the enclosure. Thus, the inner screen door prevents the accidental or blundering type of accidental contact with energized components which could be a hazard to the serviceman or operator.

Often, in such metal-enclosed switchgear, potential transformers and high voltage potential transformer fuses are situated within the switchgear and protected behind the hinged screen door. It is desirable to gain access to the fuses to remove them in order to isolate the potential transformer from the high voltage circuit so that service can be performed. The removal and handling of such potential transformer fuses would be accomplished, of course, with insulated tools or other apparatus and equipment to protect the lineman from direct contact with the high voltage energized components. However, if the potential transformer happens to be loaded such as by supplying current to heaters or other instruments, a hazardous electrical arc may result when the fuse is removed from the mounting. Further, in certain circumstances, the potential transformer may inadvertently become energized from its low voltage side if a maintenance man happens to connect a 120 volt power source to, for example, one of the components normally connected to the low voltage side during component testing.

Accordingly, it would be a desirable advance in the art to provide an electrical switch interlock arrangement which automatically disconnects the electrical components within the switchgear when the door is opened so that accidental shock or damage to the equipment is avoided. The present invention provides a new and unique electrical switch interlock for electrical equipment which solves the problems presently existing in the prior art.

BRIEF SUMMARY OF THE INVENTION

An electrical interlock apparatus for electrical equipment in accordance with the present invention comprises a hollow enclosure having an openable door overlying an access opening into the enclosure, and a housing having a key opening therethrough positioned within the enclosure adjacent the access opening. An electrical switch means is positioned within the housing, and the switch means completes an electrical circuit when closed and terminates an electrical circuit when opened. An operating means is associated with the switch means for closing the switch means when engaged and opening the switch means when disengaged. A key projection is mounted on the door and is positioned to enter the opening in the housing to engage the operating means when the door is closed and to disengage the operating means when the door is opened.

Thus, as long as the door is closed, electrical current may be supplied to the components within the enclosure interconnected to the switch means. However, a serviceman cannot gain access to those components while the door is closed. Once the serviceman opens the door to the enclosure, the switch means is automatically operated by the operating means so that the electrical current supply to the components is terminated. The serviceman can then perform service on the components without risk of electrical shock.

The operating means is spring biased to cause the operating means to open the switch means when disengaged. Thus, when the door is opened, the operating means automatically causes the switch to open. The key projection comprises a finger member mounted on and extending essentially perpendicular to the door, and the key opening in the housing is dimensioned slightly larger than the finger member. Thus, the key opening is sufficiently small that the serviceman cannot accidentally contact the operating means and close the switch while the door is opened. Consequently, accidental energization of the electrical components is substantially precluded while the door is opened.

Accordingly, it is a primary object of the present invention to provide an electrical interlock apparatus for electrical equipment that automatically disconnects electrical components within enclosed electrical equipment when an access door is opened.

It is a further object of the present invention to provide an electrical interlock that automatically disconnects the low voltage terminals of potential transformers within an enclosure when the access door is opened.

It is yet another object of the present invention to provide a substantial positive operating switch that will positively interrupt current flow when opened.

It is yet another object of the present invention to provide an interlock switch arrangement which is relatively immune to deliberate or inadvertent operation when the access door is opened.

DESCRIPTION OF THE DRAWINGS

FIG. 1 is a front view of the metal-enclosed switchgear incorporating the present invention.

FIG. 2 is a partially fragmentary front view of a screen door with an interlock arrangement in accordance with the present invention positioned at the lower portion of the screen door.

FIG. 3 is a partially fragmentary side cross-sectional side view of an interlock arrangement in accordance with the present invention positioned at the upper portion of the screen door.

FIG. 4 is a rotated top view taken substantially along line 4—4 in FIG. 3.

FIG. 5 is an upper right rear perspective partially exploded view of the interlock arrangement in accordance with the present invention.

DETAILED DESCRIPTION OF THE PREFERRED EMBODIMENT

With reference to FIG. 1, illustrated is a typical metal-enclosed switchgear arrangement comprising three units 10, 12, and 14. Each of units 10, 12, and 14 is a self-contained metal enclosure having top, back, and side walls, and an access opening 16 through a front wall 18. Overlying the access opening 16 is a metal door 20 mounted on hinges 21 that can be closed as shown with respect to unit 12 or opened as shown with respect to units 10 and 14. Positioned behind door 20 is a hinged screen door 22 that overlies the access opening 16 and normally closes the access opening as shown with respect to unit 14 but which may be opened to permit access to the interior of the switchgear as shown with respect to unit 10. Door 20 has a handle 24 which can be used to lock door 20 over the access opening 16 to prevent unauthorized access. An additional locking means 26 is provided beneath door 20 to lock screen door 22 over the access opening. Thus, to gain access to the switchgear, both door 20 and screen door 22 must be opened.

Within the interior of the switchgear units 10, 12 and 14 are electrical components such as switches 28, potential transformers 30, and potential transformer fuses 32. Various other electrical components may be mounted within the enclosure units depending upon the requirements of the distribution system.

Mounted to the interior of unit 10 adjacent to and near the top and the bottom of screen door 22 adjacent the unhinged edge are projecting key fingers 42 which extend essentially perpendicularly to the plane of the screen door 22. Two switch housing assemblies 40 are shown, one at the top and one at the bottom of unit 10. However, it should be understood that only one assembly 40 may be necessary in some applications of the present invention.

With reference to FIGS. 3, 4, and 5, switch housing assemblies 40 comprise an essentially three-sided mounting assembly 43 comprising a bottom wall 44, a side wall 46, and a front wall assembly 48 joined together in an essentially three-sided configuration by any suitable means such as by welding. Mounting assembly 43 is attached to a mounting bracket 45 by bolts 47. A cover assembly 50 comprises a top wall 52, a side wall 54, and a rear wall 56 joined together in an essentially three-sided configuration by welding or any other suitable means. Front wall assembly 48 comprises a lower portion 58 and an upper portion 60 joined together by welding or other suitable means. The upper portion 60 of front wall assembly 48 is bent at point 62 so that a mounting flange 64 extends across the interior portion of switch housing assembly 40. Upper portion 60 of front wall assembly 48 is also bent at point 66 so that the lower portion of front wall assembly 48 is slightly recessed with respect to screen door 22 so that it does not engage bolts 39 that mount key finger 42 to screen door 22. Normally, cover assembly 50 is positioned over mounting assembly 43 and firmly attached to flanges 68 and 70 on side wall 46 and bottom wall 44 respectively by screws 72 to form an enclosed boxlike housing.

Mounted beneath mounting flange 64 by bolts 74 is switch 76. Terminals 78 and 79 are provided on each side of switch 76, and lead wires 80 and 82 are connected to terminals 78 and 79, respectively. A shaft 84 extends from the top of switch 76 through and opening 86 in mounting flange 64. Shaft 84 is essentially round but has a flattened upper surface 88. A switch lever 90 is mounted on the upper end of shaft 84 that extends through mounting flange 64. An opening in switch lever 90 is similarly formed to engage the flat surface 88 of shaft 84 so that the pivoting of switch lever 90 causes shaft 84 to rotate.

Shaft 84 extends into the interior of switch 76 and causes contacts (not shown) within switch 76 to open and close depending upon the position of switch lever 90. A screw 92 holds switch lever 90 on shaft 84. Shaft 84 is spring biased to urge switch lever 90 to rotate in a counterclockwise direction as viewed in FIG. 4 to open the contacts within switch 76. When door 22 is closed, key finger 42 extends through a small rectangular opening 94 in front wall assembly 48 and engages switch lever 90 pivoting switch lever 90 in a clockwise direction to the position shown in solid lines in FIG. 4. In this position, the switch contacts within switch 76 are closed completing an electrical circuit between the terminals 78 and 79 so that electrical current can flow through lead wires 80 and 82. FIG. 2 shows a switch arrangement for the bottom of the screen door 22 whereas FIGS. 3, 4, and 5 show a switch arrangement for the top of the screen door.

When screen door 22 is opened, key finger 42 is withdrawn from opening 94 allowing switch lever 90 to pivot as a result of the spring bias on shaft 84 to the position illustrated by the dotted lines designated 90' in FIG. 4. In this position, the switch contacts within switch 76 are opened thereby opening the circuit between terminals 78 and 79 so that current flow through lead wires 80 and 82 cannot occur. Typically, lead wires 80 and 82 are connected between the low voltage terminals of potential transformers 30 and any electrical component powered by those low voltage terminals such as heaters or control equipment so that when screen door 22 is opened, the low voltage terminals of the potential transformers 30 are effectively disconnected. It should also be understood that switch 76 could have any number of terminals 78 and 79 to which any number of lead wires could be connected to disconnect any number of components including multiple potential transformers 30 or both sides of the secondary windings of transformers 30. This disconnects any load from the potential transformers so that the serviceman can remove the fuses 32 without the risk that transformer high voltage will be excited through its secondary connections. However, the present invention may be utilized to disconnect a variety of electrical components within an enclosure upon opening an access door.

An additional advantage and feature of the present invention is that rectangular opening 94 is dimensioned to be slightly larger than key finger 42 so that door 22 cannot be closed unless and until key finger 42 is admitted by opening 94. Thus, it is assured that the door 22 cannot be closed until such time as the proper alignment is achieved in cases where the door is accidentally bent or damaged. Further, since rectangular opening 94 is relatively small, and switch 76 is fully enclosed within housing assembly 40, it is virtually impossible for the serviceman to accidentally operate switch 76 while the screen door 22 is opened. To be able to close the switch after the door is opened, some small instrument must be consciously inserted through rectangular opening 94. Accordingly, conscious effort would be required to close switch 76 thereby eliminating the possibility of accidental energization of the components while the serviceman is performing services within the enclosure. In this manner, rectangular opening 94 operates much like a keyway, and key fingers 42 act much like a key so that other objects will not normally come in contact with the switch lever 90.

While the present embodiment is illustrated in connection with metal-enclosed switchgear having a front metal door 22 and an inner screen door 22, the present invention is equally applicable to any of a variety of metal-enclosed switchgear which have a single outer door but do not utilize an inner screen door. In this instance, the key finger 42 would be mounted to the single exterior door so that the opening of that door would disconnect the electrical components within the enclosure.

Further, although the present embodiment has been described in relation to potential transformers, a variety of types of transformers including instrument transformers and control power transformers may also be disconnected through utilization of the interlock arrangement of the present invention.

It should be expressly understood that various alterations, modifications, and changes in the structure of the embodiment illustrated herein may be made without departing from the spirit and scope of the present invention as defined in the appended claims.

I claim:

1. In metal-enclosed high voltage switchgear including a hollow metal enclosure having an access opening in a side thereof, a hinged door overlying the access opening for preventing access to the interior of the enclosure when closed, a hinged screen door overlying the access opening between the access opening and the hinged door for preventing access to the interior of the enclosure when closed but allowing access to the interior of the enclosure when opened, and electrical components within the interior of the enclosure having a source of electrical energy connected thereto; an improvement comprising:

a switch housing mounted within the enclosure adjacent the access opening, said switch housing having a key opening formed through a front surface of said switch housing facing the access opening;

an electrical switch means mounted within said housing connected between the source of electrical energy and the electrical components for electrically connecting the components when closed and electrically disconnecting the components when opened;

an operating means positioned adjacent said key opening for closing said switch means when engaged and opening said switch means when disengaged;

a key projection mounted on the screen door positioned to project through said key opening and thereby align the screen door so that said key projection will engage said operating means when the screen door is closed over the access opening and disengage said operating means so that the source of electrical energy to the components is disconnected when the screen door is opened.

2. An improvement, as claimed in claim 1, wherein said operating means comprises a lever arm pivotably mounted on said switch, said lever arm being spring biased to normally open said switch and being pivotable to close said switch when engaged by said key projection when the screen door is closed.

3. An improvement, as claimed in claim 1, wherein said key opening is dimensioned just slightly larger than said key projection so that other objects cannot accidentally engage said operating means while the screen door is open.

* * * * *

UNITED STATES PATENT AND TRADEMARK OFFICE
CERTIFICATE OF CORRECTION

PATENT NO. : 4,073,000
DATED : February 7, 1978
INVENTOR(S) : Richard E. Krejsa

It is certified that error appears in the above-identified patent and that said Letters Patent are hereby corrected as shown below:

Column 1, line 7, "inventio" should read "invention".

Column 5, line 16, figure "22" [first instance] should read "20".

Signed and Sealed this

Thirtieth Day of May 1978

[SEAL]

Attest:

RUTH C. MASON
Attesting Officer

LUTRELLE F. PARKER
Acting Commissioner of Patents and Trademarks